(12) United States Patent
Ewans (10) Patent No.: US 10,900,852 B2
(45) Date of Patent: Jan. 26, 2021

(54) ROWING POWER MEASUREMENT

(71) Applicant: John Frayn Ewans, Henley-on-Thames (GB)

(72) Inventor: John Frayn Ewans, Henley-on-Thames (GB)

(*) Notice: Subject to any disclaimer, the term of this patent is extended or adjusted under 35 U.S.C. 154(b) by 21 days.

(21) Appl. No.: 16/156,529

(22) Filed: Oct. 10, 2018

(65) Prior Publication Data

US 2019/0107450 A1  Apr. 11, 2019

(30) Foreign Application Priority Data

Oct. 10, 2017 (GB) .................................. 1716549.9

(51) Int. Cl.
| | |
|---|---|
| *B63H 16/06* | (2006.01) |
| *G01L 3/24* | (2006.01) |
| *G01L 5/00* | (2006.01) |
| *G01L 1/22* | (2006.01) |
| *G01L 3/08* | (2006.01) |

(52) U.S. Cl.
CPC .............. *G01L 3/247* (2013.01); *B63H 16/06* (2013.01); *G01L 1/22* (2013.01); *G01L 3/08* (2013.01); *G01L 5/0033* (2013.01); *G01L 5/0038* (2013.01)

(58) Field of Classification Search
CPC .............. B63H 16/06; B63H 2016/063; B63H 16/067; B63H 16/073; A63B 9/06; A63B 2069/064; A63B 2069/066
See application file for complete search history.

(56) References Cited

U.S. PATENT DOCUMENTS

| | | |
|---|---|---|
| 7,114,398 B2 | 10/2006 | Haines |
| 10,016,158 B2 | 7/2018 | Donohoe |
| 2016/0263438 A1* | 9/2016 | Donohoe ............. A61B 5/6895 |
| 2017/0190404 A1* | 7/2017 | Mandanis ........... G01M 5/0083 |

* cited by examiner

*Primary Examiner* — Andrew Polay
(74) *Attorney, Agent, or Firm* — Davis & Bujold PLLC; Michael J. Bujold (57) ABSTRACT

An oarlock-installation for a boat in which an oarlock is mounted on an upright pin for angular displacement about the pin during rowing of the boat, the oarlock-installation comprising a mechanism for deriving measurements of angular displacement of the oarlock from a datum angle about the pin during the rowing, a mechanism for deriving measurements of force exerted on the oarlock during the rowing, and a mechanism for deriving measurement of rowing power from the measurements of force and the measurements of angular displacement. The rowing-boat oarlock-installation may also comprises a power module, attached to the oarlock, which is responsive to rowing of the rowing-boat to derive force measurements in accordance with rowing forces exerted on the power module during the rowing.

16 Claims, 15 Drawing Sheets

ROWING POWER MEASUREMENT

This application claims priority from United Kingdom patent application serial no. 1716549.9 filed Oct. 10, 2017.

FIELD OF THE INVENTION

This invention relates to rowing power measurement, and in particular to measurement of power exerted by rowers during rowing.

BACKGROUND OF THE INVENTION

The measurement of power in this latter context has been recognised as desirable towards achieving better rowing efficiency, and more especially towards improvement of an individual rower's rowing performance, and better rowing coordination between rowing crews.

Previous proposals for implementing the measurement of power exerted by rowers during rowing, have generally been too expensive for general use and/or have been lacking in ease of use and application. It is an object of the present invention to overcome these problems to at least a large extent.

SUMMARY OF THE INVENTION

According to one aspect of the present invention there is provided a rowing-boat oarlock-installation in which an oarlock is mounted on an upright pin for angular displacement about the pin during rowing, and the installation includes means for detecting angular displacements of the oarlock from a datum angle defined in the pin.

Detection of angular displacements of the oarlock from the datum may involve optical means with measurements of the angular displacements derived from a MEMS (micro-electro-mechanical system) gyro. As an alternative the means for detecting angular displacements of the oarlock and providing measurements of the angular displacements may be a rotary encoder.

According to another aspect of the invention there is provided a rowing-boat oarlock installation wherein a power module is adapted to be attached to an oarlock of the installation for deriving force measurements in accordance with forces exerted on the power module during rowing, and wherein a computation of power exerted during rowing is made in accordance with these measurements and measurements of drive angle derived by the power module during rowing.

According to a further aspect of the invention there is provided a rowing-boat oarlock-installation wherein a modular power meter is fitted to an oarlock that is adapted to provide in conjunction with the fitted power meter measurements of force created in the oarlock during rowing together with measurements of angular displacement of the oarlock occurring contemporaneously with those forces.

BRIEF DESCRIPTION OF THE DRAWINGS

A rowing-boat oarlock-installation according to the present invention for providing rowing power measurement will now be described, by way of example, with reference to the accompanying drawings, in which.

The oarlock-installation to be described is typical of an identical oar-lock installation that is provided on the outrigger of each rower of a sweep boat or shell, whereas in the case of a sculling boat a pair of such outrigger-mounted installations is provided for each rower. In each case, the normally-provided, standard oarlock-installation is replaced in accordance with the invention, by an oarlock-installation which includes an oarlock 1 as shown in FIGS. 1 and 2.

DETAILED DESCRIPTION OF THE PREFERRED EMBODIMENTS

Figure 1:
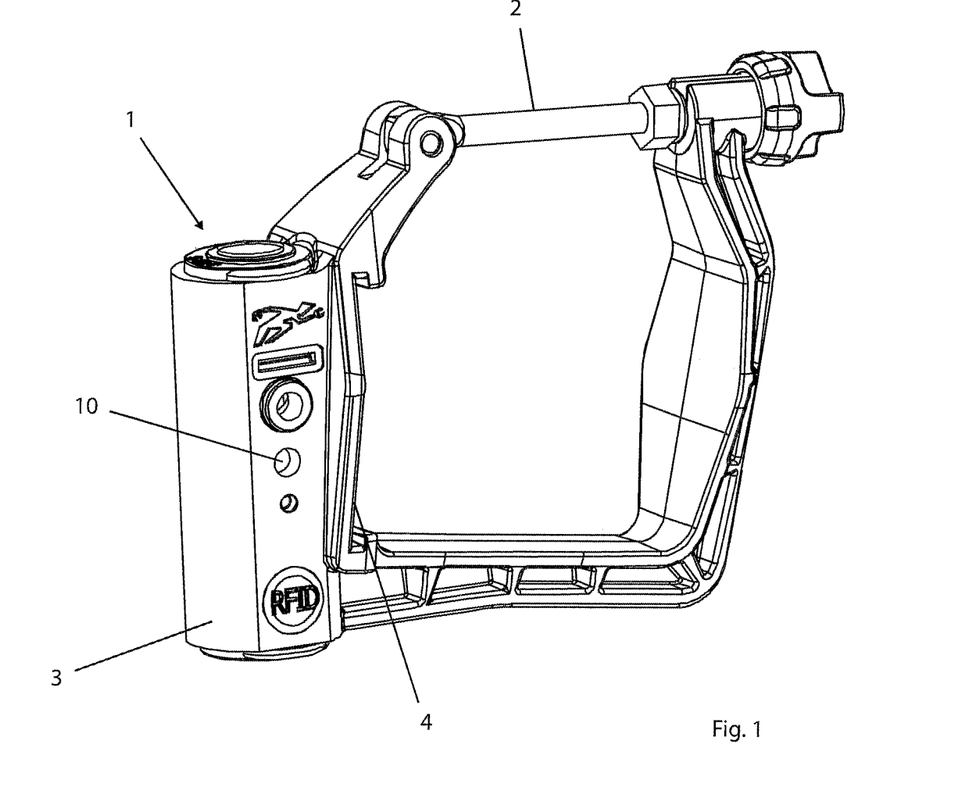
FIGS. 1 and 2 are, respectively, three-quarter rear and front views of the oarlock of the oarlock-installation of the present invention.
Figure 2:
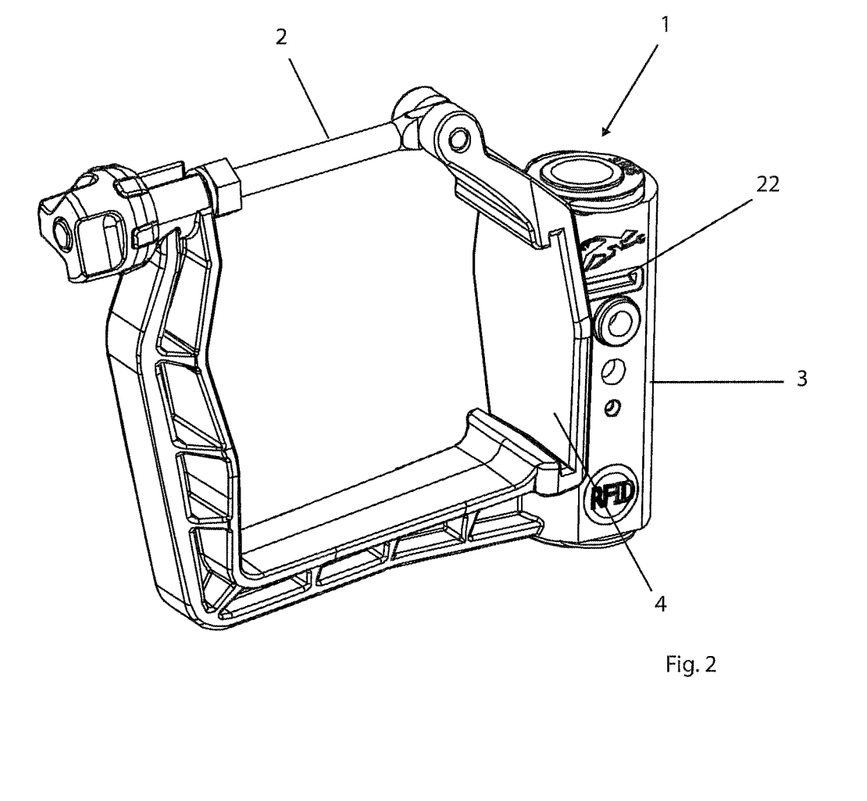

Referring to FIGS. 1 and 2, the oarlock 1 in this case is generally of the same U-shape form as that of a standard oarlock with a gate 2 for retaining the collared sleeve of an oar (not shown) from slipping out of the oarlock 1. However, the oarlock 1 has a front working-surface 4 that is recessed as compared with the replaced, standard oarlock.

Figure 3:
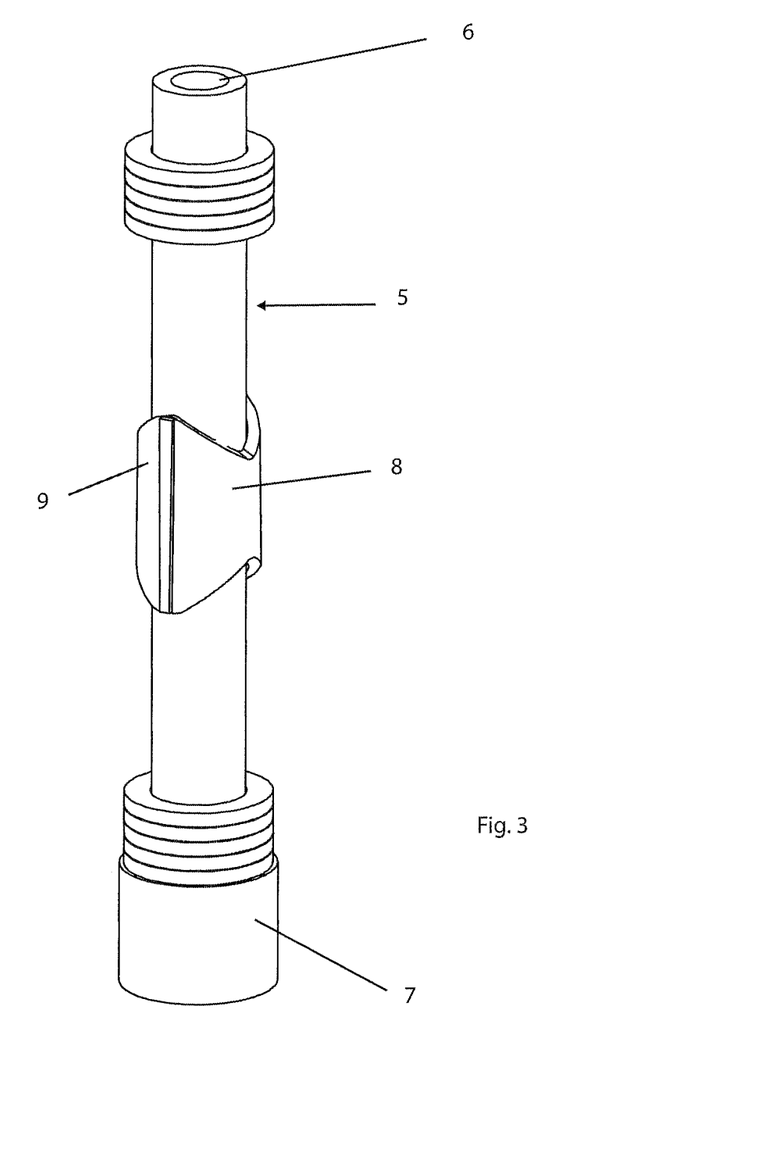
FIG. 3 shows a standard pivot pin that has been adapted for use with the oarlock of FIGS. 1 and 2 for angle measurement.

The standard pivot pin on the boat is retained and it is onto this pin 5 that the oarlock 1 is pivotally mounted to extend through the column 3 and be secured by a top screw 6 and a bottom nut 7. The pin 5 is adapted for use in angle measurement by fitting a sleeve 8 to it as shown in FIG. 3. The sleeve 8 is secured coaxially with the pin 5 at an intermediate position along its length within the column 3, and carries a visually-distinct marking in the form of a line 9 aligned axially with the pin 5. The line 9 may be provided as a white line, but is preferably provided as a narrow reflective-mirror line.

The line 9 is visible through an aperture 10 in the side of the column 3 when the oarlock 1 is turned about the pin 5 into a datum angular orientation in which the oar retained in the oarlock 1 is at right angles to the boat.

Figure 4:
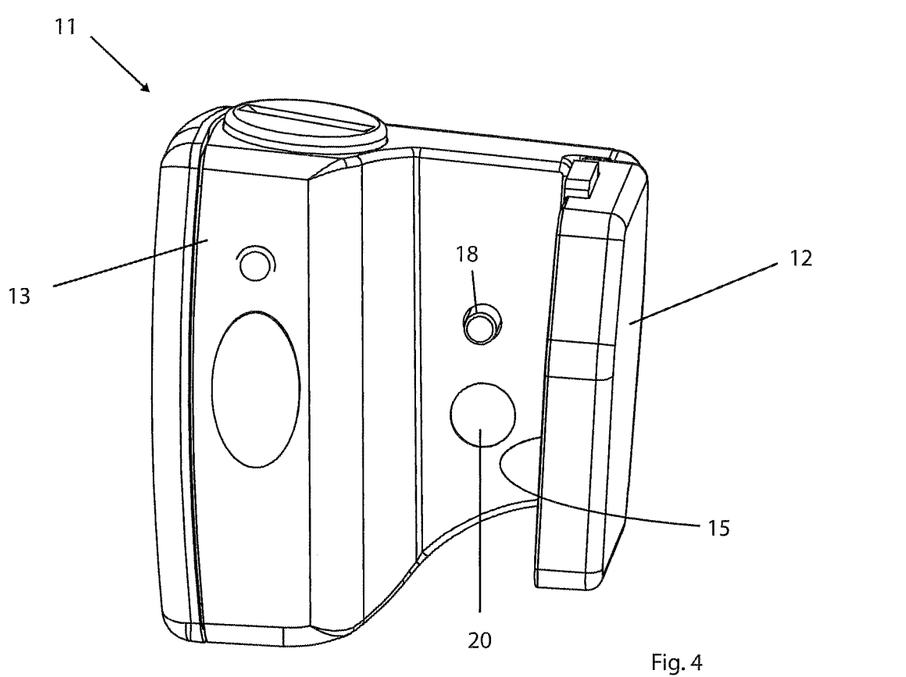
FIGS. 4 and 5 are, respectively, three-quarter rear and front views of a power module according to the present invention for fitting to the oarlock of FIGS. 1 and 2.
Figure 5:
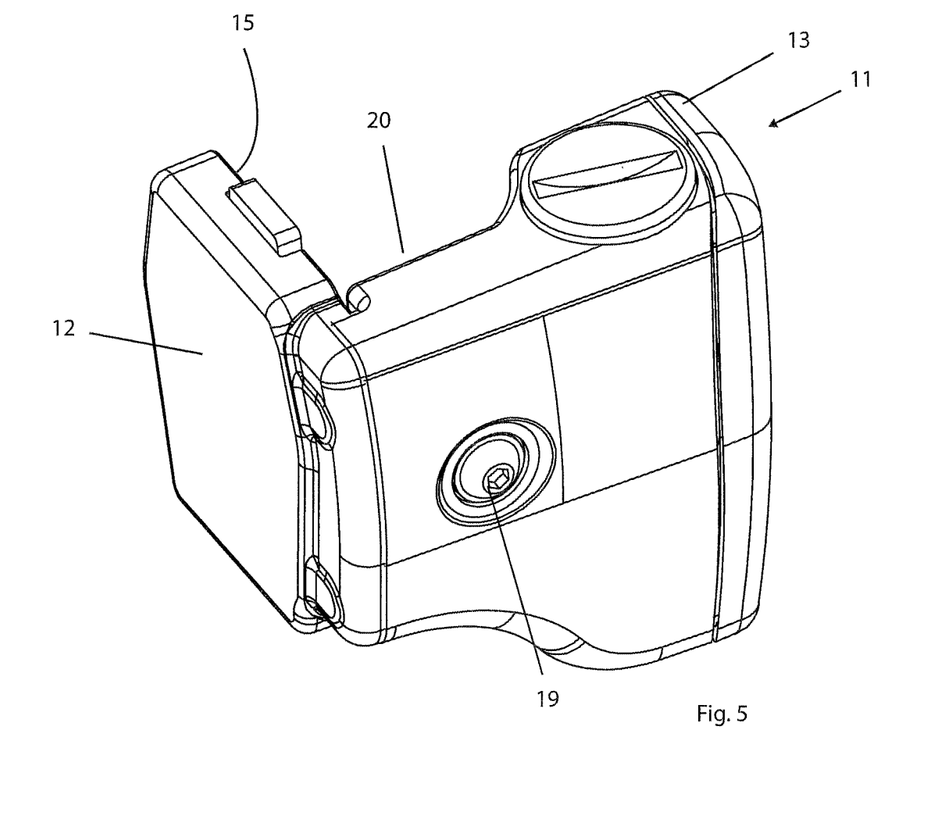
Figure 6:
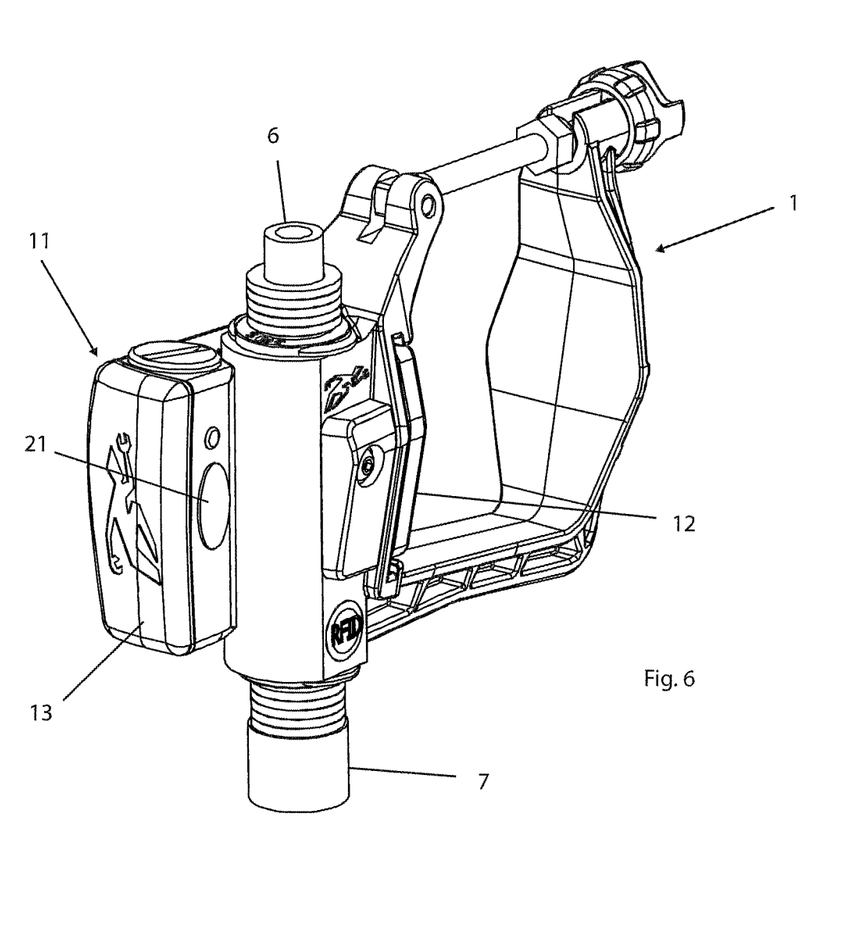
FIGS. 6 and 7 are, respectively, three-quarter rear and front views of the oarlock of FIGS. 1 and 2 mounted on the pin of FIG. 3 and fitted in accordance with present invention with the power module of FIGS. 4 and 5 for determining measurements of rowing force and drive angles during rowing.
Figure 7:
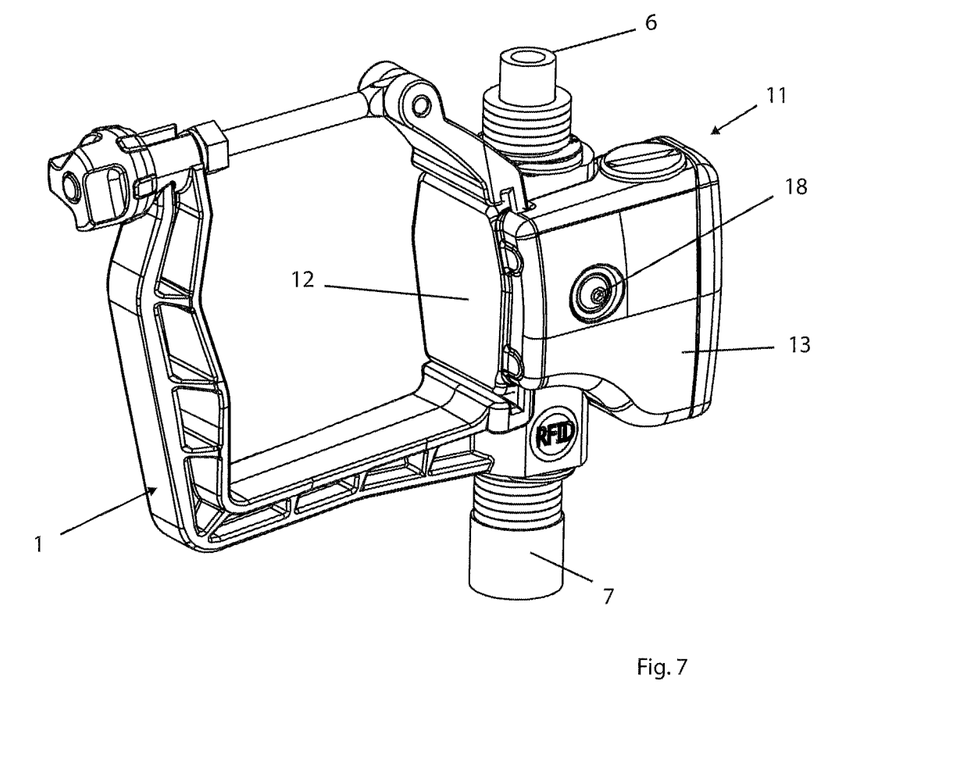

After the oarlock 1 has been mounted on the pin 5, measurements of rowing power and other rowing variables are obtainable by fitting a power module 11 as illustrated in FIGS. 4 and 5, to the oarlock 1. FIGS. 6 and 7 show the pin-mounted oarlock 1 fitted with the power module 11.

Referring firstly to FIGS. 4 and 5, the power module 11 is generally of an L-shape (best seen in FIG. 5) having a limb 12 and head 13 that are adapted for clamping the power module 11 to the oarlock 1. In the latter respect, the power module 11 is fitted to the oarlock 1 as illustrated in FIGS. 6 and 7, with the inside face 15 of its limb 12 abutting the face 4 of the oarlock 1.

The power module 11 is retained on the oarlock 1 by means of a clamping screw 18 that projects through the side of the module 11. The screw 18 engages with the oarlock 1 to hold the module 11 to the oarlock 1 when twisted one way, but disengages to release the module 11 from it when twisted in the opposite sense. It would be possible to provide that the module 11 clips to the oarlock 1, but it is preferred to use clamping rather than clipping for security purposes.

With the power module 11 clamped or otherwise held as described to the oarlock 1, an optical sensor (not shown) within the head 13 is aligned through an aperture 20 with the aperture 10 to respond to light reflected from the datum line 9 of the pin 5. As the oarlock 1 is angularly displaced about the pin 5 in either sense so the optical sensor within the head 13 detects the reflected light from the line 9 supplied by the power module 11. The extent to which the oarlock 1 is angularly displaced from alignment with the datum line 9, and the sense of that displacement, is determined by a MEMS gyro or an electronic accelerometer circuit (not shown) within the head 13 of the power module 11.

A pushbutton 21 is provided on the side of the power module 11 as part of an electronic circuit (not shown) within the module 11 that enables any correction required to the angular measurement (for example because of any misalignment of the sleeve 8 on the pin 5) to be made. In this regard, operation of the pushbutton 21 when the oarlock 1 is properly aligned with the boat geometry, is operative within the relevant electronic circuitry of the power module 11 to provide a digital correction factor that is recorded electronically by the module 11 on an RFID or other memory chip (not shown) located within an opening 22 (see FIG. 2) in the bearing column 3. Other data may be recorded on the RFID or other chip; for example the overall length and handle-length of the oars could be recorded.

The RFID or other memory chip within the opening 22 is available to be read by the module 11 when fitted to the oarlock 1, or by any other compatible power module subsequently fitted to the oarlock 1, for use in correction of the angular measurements derived by the MEMS gyro; where other data is recorded on the RFID or other chip, this too may be read by the fitted module for use, for example, in the computation of power.

Instead of recording the correction factor in a memory chip it could be recorded on the oarlock, for example, as a written number, or by the setting of numbered dials or other indicators, with the requirement that the rower enters the recorded data into the power meter when it is fitted.

It is to be noted that there would be no need for implementing a correction factor if it were found that the sleeve 8 could be positioned precisely enough on the pin 5 for accurate definition of the datum. Alternative ways of defining the zero datum and measuring angular displacement could be based on magnetic-field sensing, triggering a micro-switch from a cam accurately positioned on, or otherwise, in relation to the pin, or a rotary sensor or encoder.

The limb 12 of the power module 11 incorporates strain gauges (not shown) that respond to pressure applied to the limb 12 as this is sandwiched between the oar and the face 4 within the oarlock 1. These gauges provide the varying force measurements experienced during the drive portion of each stroke as the oar is moved between catch and release.

Figure 8:
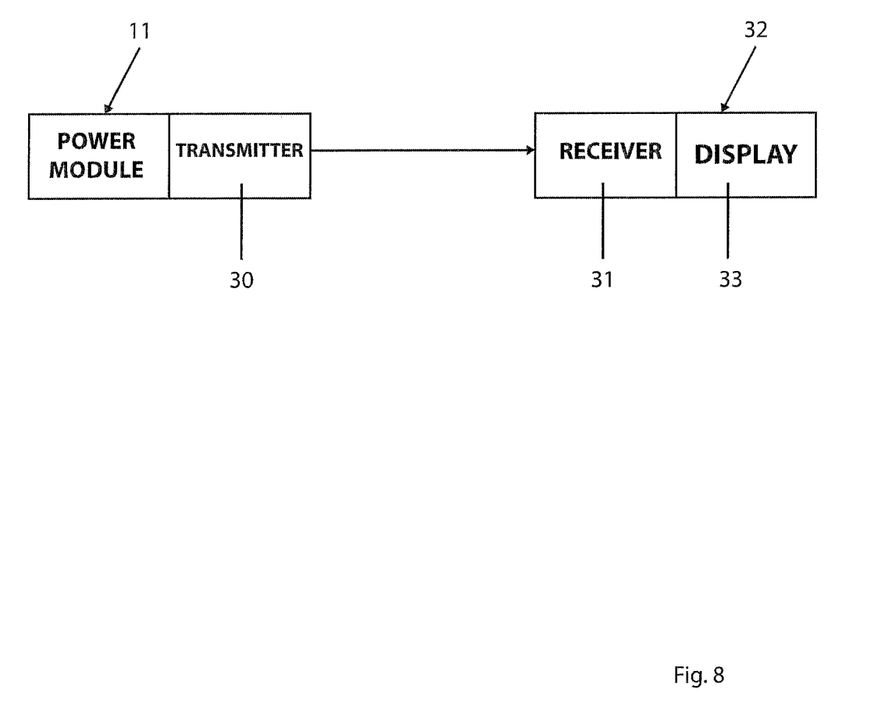
FIG. 8 is a block schematic diagram illustrating the transmission wirelessly of measurements derived by the power module of FIGS. 4 and 5 when the power module is fitted to the oarlock-installation of FIGS. 6 and 7.

As illustrated by the schematic representation of FIG. 8, the measurements of force and angular displacement derived by the power module 11 are transmitted wirelessly (for example, according to the BLUETOOTH protocol) from a transmitter 30 of the power module 11 to a receiver 31 of a display module 32.

In addition to the receiver 31 and a display section 33, the module 32 includes a computing and data-storage facility (not shown) for deriving digital and graphic displays from the measurements transmitted from the power module 11, and data that has been entered into the module 32 manually or electronically for storage. Among the various forms of display that can be selected for representation by the display section 33, are digital and graphic displays of power achieved by the individual rower together with other variables applicable to his/her performance and characteristics.

The oarlock-installation as described above has the advantage that it can be implemented without undue expense and very simply. Moreover, it is possible to equip permanently and economically each rowing position of even eights or other boats with an oarlock and pin as illustrated and described above with reference to FIGS. 1 to 3, and utilise a single power module 11 for checking the measurements of the various rowers individually and one by one, from time to time. This checking can be carried out easily and swiftly without the need for any set-up delays, since the oarlock at each position has any required correction already stored for immediate reading by the power module 11 when deployed at that position. Moreover, a set of standard height-adjustment clips can be permanently allocated to each individual oarlock 1, the clips of the set being divided for insertion of the individual clips on the pin 5, top or bottom of the oarlock 1 according to the height of the oarlock required; there is a possibility also to provide for adjustment in regard to blade pitch. With boats where the rowers change positions, there will accordingly be no need for adjustments to be made to the oarlock installations between uses.

Furthermore, when a power module 11 is not deployed at any oarlock-installation, the oarlock can still be utilised for normal rowing, by fitting to it an inexpensive wear plate (not shown) against the working-surface 4 of the oarlock 1. Or, a simple, inexpensive dummy power module 41 as illustrated in FIGS. 9 and 10 may be fitted.

Figure 9:
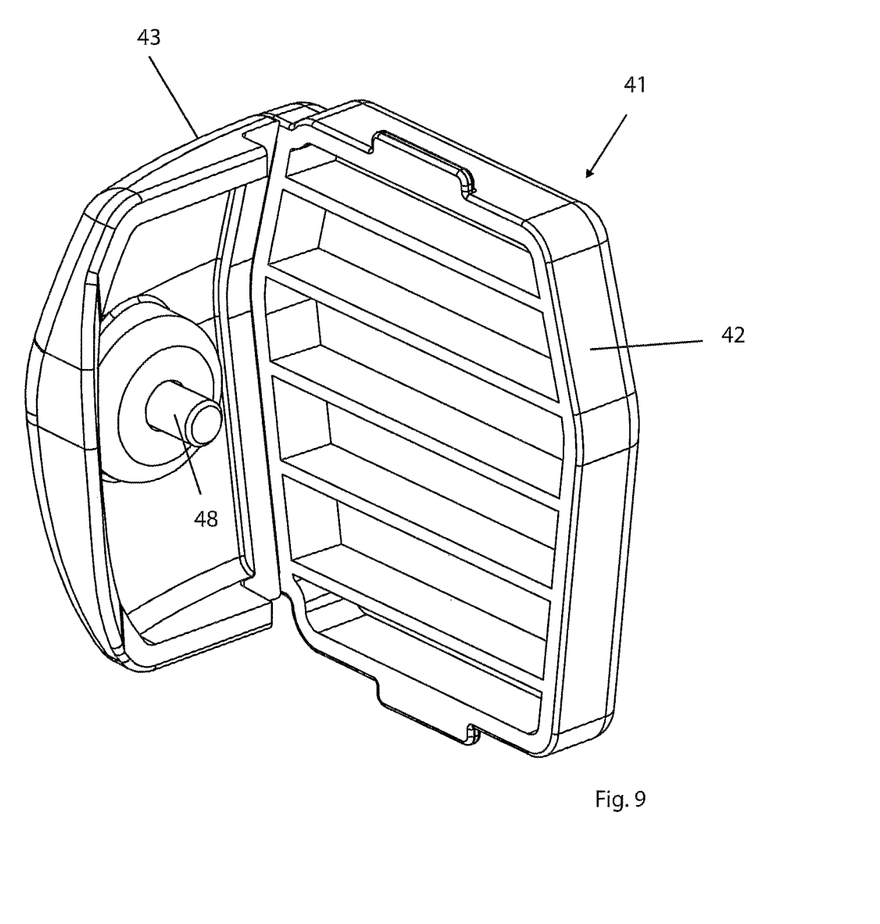
FIGS. 9 and 10 are respectively, three-quarter front and rear views of a dummy power-module for fitting to the oarlock of FIGS. 1 and 2 in the absence of the fitting of the power module of FIGS. 4 and 5 to it, so as to enable normal use to be made of the oarlock.
Figure 10:
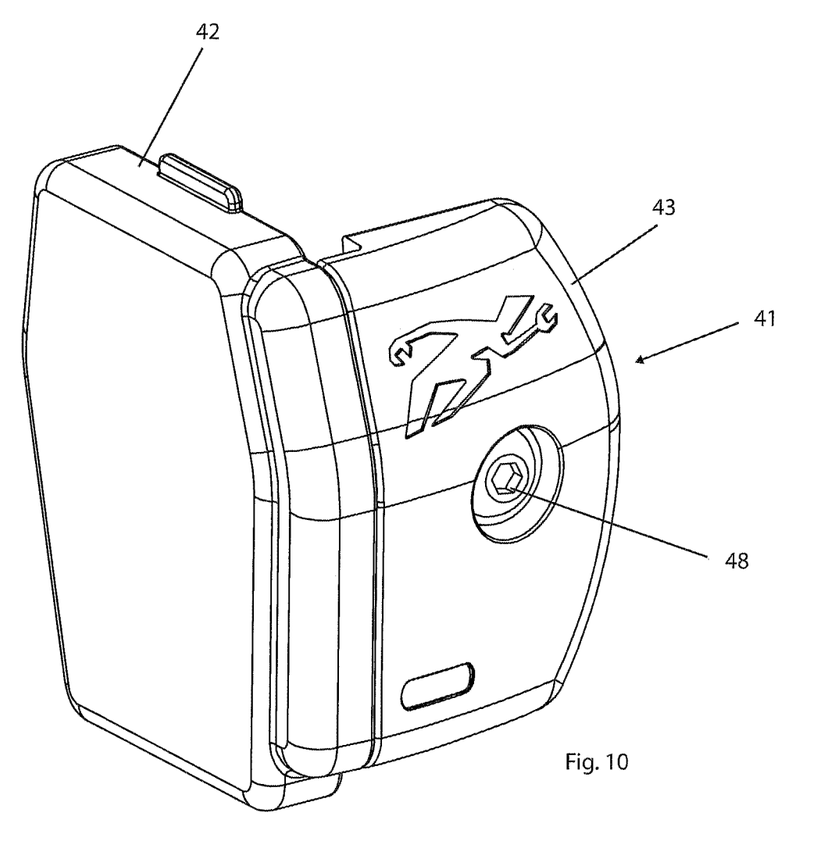

Referring to FIGS. 9 and 10, the dummy power module 41 is of the same general configuration as the power module 11, providing a limb 42 and a head 43 corresponding respectively to the limb 12 and head 13 of the power module 11. The limb 42 abuts the surface 4 of the oarlock 1 to protect appropriately against wear during rowing, and a screw 48 projects through the head 43 to engage with the oarlock 1 in holding the module 41 to it when twisted one way, but releases the hold when twisted the other way.

Figure 11:
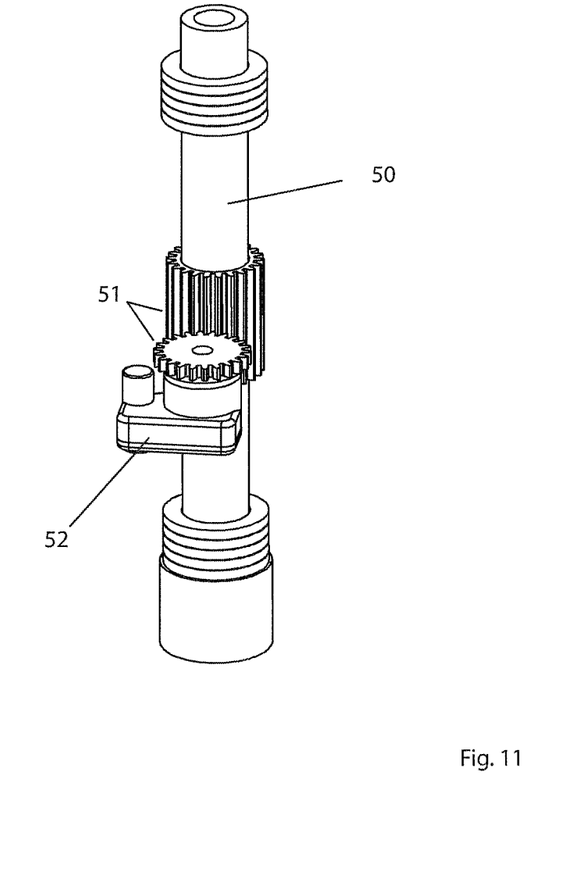
FIG. 11 shows a form of pivot pin that may be used for oarlock-angle measurement as an alternative to the pin of FIG. 3.

FIG. 11 illustrates an alternative angle-sensing method. In this modification, gearing 51 is used to provide a measure of the angular displacement of the oarlock 1 instead of using a MEMS gyro; a narrow reflective strip would still be used, in this case in the gearing. The angular displacement of a device 52 (such as a rotary encoder or even a MEMS gyro unit), can be used via the gearing 51 to provide an output signal for transmission to the receiver 31 of the module 32 from the transmitter 30 of the power module 11.

Figure 12:
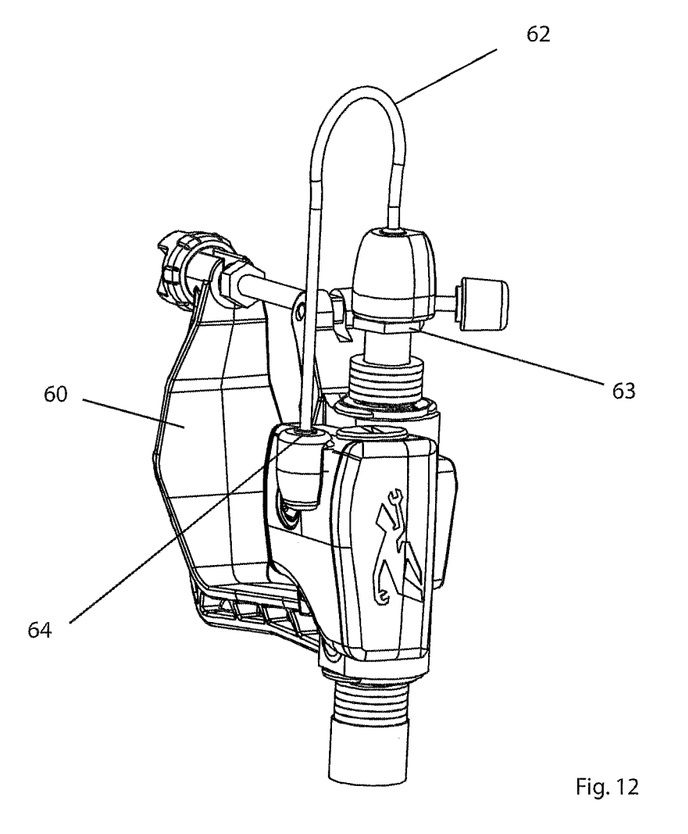
FIGS. 12 to 15 are illustrative of further methods and means for oarlock-angle measurement.
Figure 13:
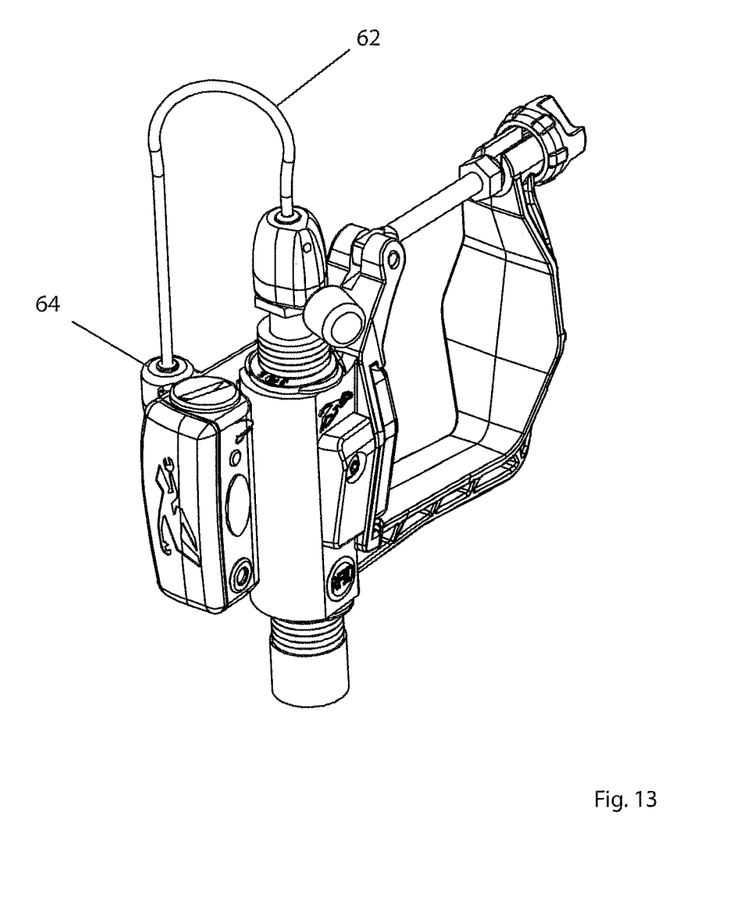

FIGS. 12 and 13 illustrate an alternative method of measuring the angle of the oarlock during rowing. In this, the angle of the oarlock 60 relative to the datum of the pivot pin of the oarlock is applied via a flexible drive cable 62 of a form commonly referred to as a "flexible drive shaft". The cable 62 is clamped to the top nut 63 of the pin with the cable conveying angular movements of the oarlock 60 to a sensor 64, for example to a rotary Hall-effect sensor (not shown).

Figure 14:
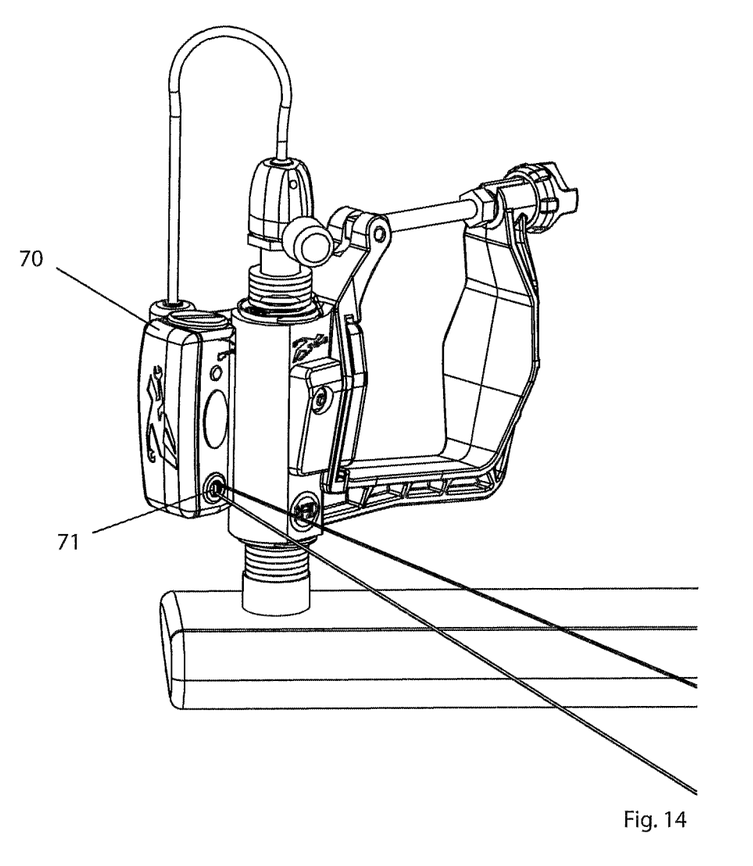
Figure 15:
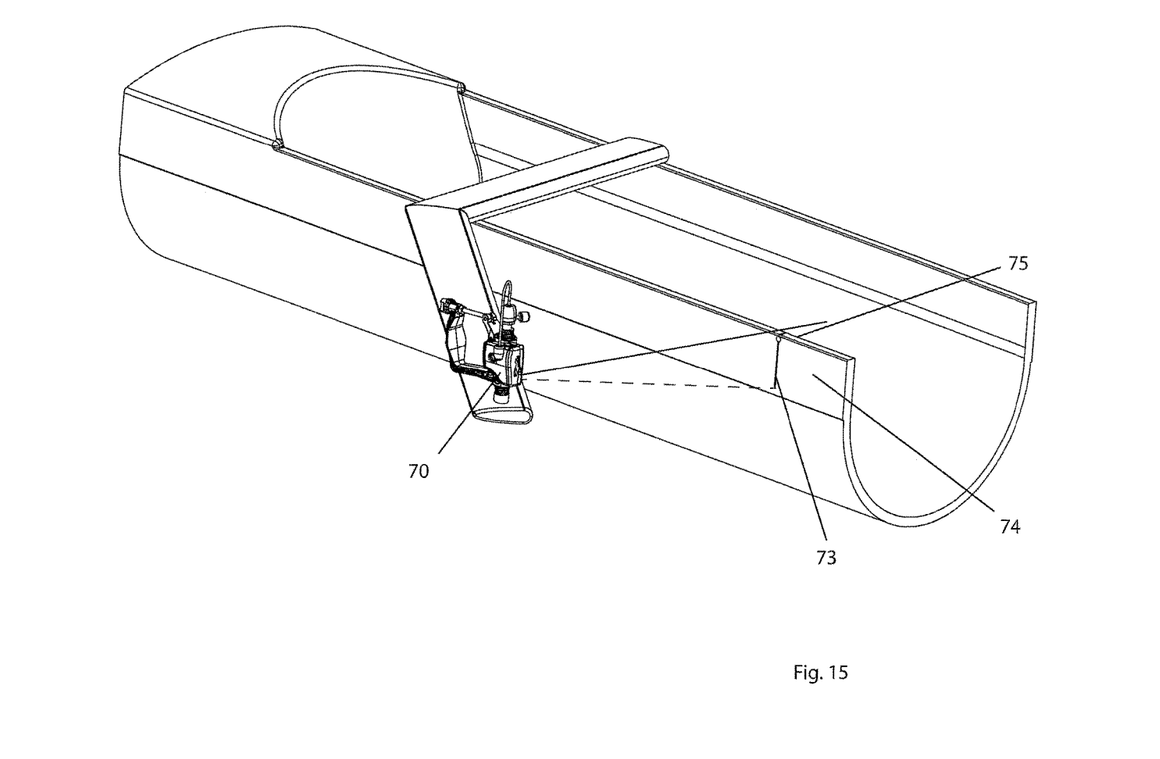

As a further alternative, a power-meter 70, as illustrated by FIG. 14 may include a laser for emitting a light beam 71. As illustrated by FIG. 15, power meter 70 may be mounted on an out-rigger 72 of the boat to direct a vertical line 73 of light 72 back onto the external surface 74 of the boat for establishing on that surface a recorded datum, reference line, when the power meter 70 is set exactly parallel with the boat. This allows the power meter 70 to be removed and returned to the boat with the least disruption by simply re-aligning the emitted laser line 73 with the recorded datum 75.

The invention claimed is:

1. An oarlock-installation of a boat in which an oarlock is mounted on an upright pin for angular displacement about the pin during rowing of the boat, the oarlock-installation comprising:
    an angle measuring means for deriving measurements of angular displacement of the oarlock from a datum angle about the pin during the rowing,
    means for deriving measurements of force exerted on the oarlock during the rowing, and
    means for deriving measurement of rowing power from the measurements of force and the measurements of angular displacement,
    wherein the datum angle is defined as an angular displacement of the oarlock relative to the pin in which a beam of light, projected from the oarlock, is aligned with a distinctive mark on the pin.

2. The oarlock-installation according to claim 1, wherein the means for deriving measurements of angular displacement of the oarlock, from the datum angle about the pin, is a gyro.

3. The oarlock-installation according to claim 1, wherein the means for deriving measurements of angular displacement of the oarlock from the datum angle about the pin, includes an accelerometer that is responsive to change of angular extent by which the oarlock is displaced relative to a datum defined in the pin.

4. The oarlock-installation according to claim 3, wherein the datum defined in the pin is indicated by a visually-distinct mark on the pin.

5. The oarlock-installation according to claim 4, wherein the mark is a reflective line aligned axially with the pin.

6. The oarlock-installation according to claim 3, wherein the means for deriving measurements of angular displacement of the oarlock from the datum angle about the pin, includes optical sensor which receives light from the power module so as to be responsive to angular displacement of the oarlock from the datum angle.

7. A rowing-boat oarlock-installation comprising:
    an upright pivot pin,
    an oarlock mounted on the pivot pin, and a power module attached to the oarlock,
    the power module comprising means responsive to rowing of the rowing-boat to derive force measurements in accordance with rowing forces exerted on the power module during the rowing, and
    means responsive to angular displacements of the oarlock during the rowing to derive angle measurements in accordance with angular displacements of the oarlock during rowing relative to a datum angle,
    wherein the oarlock-installation includes means for deriving a computation of power exerted during the rowing in accordance with the force measurements and the angle measurements, and the datum angle being defined as an angular displacement of the oarlock relative to the pin in which a beam of light, projected from the oarlock, is aligned with a distinctive mark on the pin.

8. The rowing-boat oarlock-installation according to claim 7, wherein the power module is generally of L-shape having a limb projecting from a head of the power module, the power module being attached to the oarlock with its limb abutting a working face of the oarlock within a gate of the oarlock, and the means for deriving force measurements is responsive to pressures applied to the limb during the rowing to derive the force measurements in accordance with these pressures.

9. The rowing-boat oarlock-installation according to claim 8, wherein the limb of the power module includes strain gauges to derive the force measurements.

10. The rowing-boat oarlock-installation according to claim 7, wherein the means for deriving the force measurements derives the force measurements as force signals representative of the rowing forces as these forces are exerted on the power module through each rowing stroke, and the means for deriving angle measurements derives the angle measurements as angle signals in accordance with angular displacements of the oarlock occurring contemporaneously with the forces exerted on the oarlock during each rowing stroke.

11. The rowing-boat oarlock-installation according to claim 10, wherein a display unit provides a display in accordance with the force signals and the angle signals.

12. An oarlock of a rowing boat comprising:
    an oar for rowing the boat,
    an upright pivot pin mounted on the boat,
    an oarlock mounted on the upright pivot pin, and
    the oar engaging the oarlock to exert force on the oarlock in angulary displacing the oarlock about the upright pin,
    the oar being engaged with the oarlock to exert force on the oarlock in angularly displacing the oarlock about the upright pivot pin of the boat during rowing of the boat,
    means for deriving a measure of the force exerted on the oarlock through the angular displacement of the oarlock, and
    means for deriving a measure of the angular displacement relative to a datum angle, wherein the datum angle is defined as an angular displacement of the oarlock relative to the pivot pin in which a beam of light projected from the oarlock is aligned with a distinctive mark on the pivot pin.

13. The oarlock according to claim 12, including means for deriving a measure of rowing power by calculation in accordance with the measure of the force exerted on the oarlock and the measure of angular displacement.

14. The oarlock according to claim 12, wherein the oar engages the oarlock within a gate of the oarlock.

15. The oarlock according to claim 1, wherein the means for deriving measurements of angular displacement of the oarlock from the datum angle about the pin, includes an accelerometer that is responsive to change of angular extent by which the oarlock is displaced relative to a datum point defined in the pin, and
    the means for deriving measurements of angular displacement of the oarlock from the datum angle about the pin, includes an optical sensor responsive to angular displacement of the oarlock from the datum angle.

16. The oarlock according to claim 1, wherein the pin supports one of a line, a gear and flexible drive shaft being provided on the pin for determining angular displacement of the oarlock as the oarlock moves relative to the pin during rowing.

\* \* \* \* \*